(12) United States Patent
Leedecke et al.

(10) Patent No.: US 9,208,929 B2
(45) Date of Patent: Dec. 8, 2015

(54) GTMS CONNECTOR FOR OIL AND GAS MARKET

(71) Applicant: Schott Corporation, Elmsford, NY (US)

(72) Inventors: Charles Leedecke, New Bedford, MA (US); David Filkins, Warren, MA (US); Jens Suffner, Landshut (DE); Ellen Kay Little, Pittston, PA (US); Julio Castillo, Central Falls, RI (US); Sabine Pichler-Wilhelm, Landshut (DE)

(73) Assignee: Schott Corporation, Elmsford, NY (US)

( * ) Notice: Subject to any disclaimer, the term of this patent is extended or adjusted under 35 U.S.C. 154(b) by 256 days.

(21) Appl. No.: 14/032,475

(22) Filed: Sep. 20, 2013

(65) Prior Publication Data

US 2015/0083487 A1    Mar. 26, 2015

(51) Int. Cl.
*H01B 17/30* (2006.01)
*G21C 17/116* (2006.01)
*H01B 3/08* (2006.01)
*C03C 3/00* (2006.01)
*E21B 33/038* (2006.01)
*G21C 13/036* (2006.01)

(52) U.S. Cl.
CPC .............. *H01B 17/305* (2013.01); *C03C 3/00* (2013.01); *G21C 17/116* (2013.01); *H01B 3/087* (2013.01); *E21B 33/0385* (2013.01); *G21C 13/036* (2013.01); *H01B 17/303* (2013.01)

(58) Field of Classification Search
CPC .... H01B 17/305; H01B 17/303; H01B 13/06; H01B 3/087; H05K 5/06; H05K 5/04; E21B 33/0385; G21C 13/036; G21C 17/116; C03C 3/00
USPC ............... 174/650, 262, 50.5, 50.61, 137 R, 174/152 GM; 361/302, 307, 306.1, 320, 361/321.1; 333/182
See application file for complete search history.

(56) References Cited

U.S. PATENT DOCUMENTS

| | | | | |
|---|---|---|---|---|
| 4,841,101 A * | 6/1989 | Pollock | ............... | 174/152 GM |
| 5,203,723 A | 4/1993 | Ritter | | |
| 6,903,268 B2 * | 6/2005 | Marshall et al. | ...... | 174/152 GM |
| 7,327,553 B2 * | 2/2008 | Brendel | .................. | 361/302 |
| 8,397,638 B2 | 3/2013 | Fink et al. | | |
| 8,642,887 B1 * | 2/2014 | Li et al. | ................... | 174/650 |
| 8,653,384 B2 * | 2/2014 | Tang et al. | ................ | 174/650 |

* cited by examiner

*Primary Examiner* — Angel R Estrada
(74) *Attorney, Agent, or Firm* — Ohlandt, Greeley, Ruggiero & Perle, LLP (57) ABSTRACT

A feed-through element for harsh environments is provided that includes a support body with at least one access opening, in which at least one functional element is arranged in an electrically insulating fixing material. The electrically insulating fixing material contains a glass or a glass ceramic with a volume resistivity of greater than $1.0 \times 10^{10}$ $\Omega$cm at the temperature of 350° C. The glass or a glass ceramic has a defined composition range in the system $SiO_2$—$B_2O_3$-MO.

28 Claims, 7 Drawing Sheets

GTMS CONNECTOR FOR OIL AND GAS MARKET

BACKGROUND OF THE INVENTION

1. Field of the Invention

The present disclosure relates to feed-through elements in general, but in particular to improved feed-through elements which are capable to be used in harsh environments with high operation or emergency temperatures above 260 degrees Celsius (° C.). In particular, the feed-through elements of the present disclosure can withstand operational and/or emergency pressures above 42000 pounds per square inch (psi). Therefore they can be used in a variety of applications, especially in downhole drilling equipment as well as in the safe containment of toxic matter and in spacecrafts.

2. Description of Related Art

Feed-through elements in general are well known in the art and are incorporated in a lot of devices. In general terms, such feed-through elements usually comprise an electrical conductor which is fixed within a feed-through opening by an electrically insulating material. The parameters which characterize the performance of such feed-through devices are mainly the electrical resistance of the insulating material, the capabilities to withstand heat and pressure which tends to let the insulating material and/or the conductor burst out of the feed-through access opening.

Although such feed-through elements represent a very suitable technology to guide e.g. electrical current through the housing of devices, said parameters often limit the possible application areas in which devices which contain such feed-through elements can be used. In U.S. Pat. No. 5,203,723 feed-through elements are described which are built from a metal pin which is surrounded by a polymer material as electrically insulating material. The geometry of the polymer material which surrounds the electrical conductor is adapted to withstand higher pressures by means of recesses and protrusions such as shoulders. The described feed-through elements are used for making connections within a sonde of a downhole oil well measuring or logging tool and can be used at operational temperatures above 260° C. and pressures of at maximum 28000 psi. The volume resistance of the used polymers is about $8.0 \times 10^{14}$ Ω·cm and therefore considerably excellent. However, the long term stability of such polymers is decreased with the time of the exposure to higher operational temperatures, the exposition to electromagnetic radiation such as UV or gamma radiation and also the mechanical degradation due to physical abrasion.

Feed-through elements which contain an inorganic material such as glass as electrically insulating material are also known. U.S. Pat. No. 8,397,638 describes e.g. a feed-through device of an airbag igniter, in which the access hole of a metal support body is sealed by a glass material which also holds a pin as electrical conductor. Such feed-through elements are designed to withstand the pressure of the explosive when the igniter is fired, whereas pressures about 1000 bar which correspond to 14500 psi might be observed. The electrical properties of the insulation material are not described, but it can be assumed that the electrical volume resistance of the glass material does not play a major role because the igniter is only fired once with a short electrical pulse and then the device is destructed.

Feed-through elements as described are not sufficient for applications in harsh environments, e.g. downhole drilling devices, which facilitate the exploration and/or exploitation of natural oil and/or gas resources in increasing depths and therefore are exposed to higher operational temperatures for a longer period of time. Against this background, it is an object of the present disclosure to provide a feed-through element which is suitable for use at temperatures above 260° C. and secures high electrical insulation properties of the conductor against its surrounding.

BRIEF SUMMARY OF THE INVENTION

The object is achieved by the feed-through element according to the present disclosure.

A feed-through element according to the present disclosure comprises a support body with at least one access opening, in which at least one functional element is arranged in an electrically insulating fixing material. The electrically insulating fixing material electrically insulates the functional element from the support body and thereby physically and electrically separates the functional element from the support body. Also, in other words, the electrically insulating material seals the access opening of the support body.

According to the present disclosure the electrically insulating fixing material contains a glass or a glass ceramic with a volume resistivity of greater than $1.0 \cdot 10^{10}$ Ω·cm at the temperature of 350° C. The term 'contains' predominantly include the embodiments in which the electrically insulating fixing material is made only from the glass or glass ceramic, but also a multi layered body which might comprise a sandwich of different glass and/or glass ceramic materials within the described composition range or also comprising other compositions or other materials, such as polymers.

The glass or a glass ceramic according to the present disclosure comprises in mole % on oxide basis 25%-55% $SiO_2$, 0.1%-15% $B_2O_3$, 0%-15% $Al_2O_3$, 20%-50% MO whereby MO is selected from the group consisting of, individually or in combination, MgO and/or CaO and/or SrO and/or BaO, and 0% to less than 2% $M_2O$, wherein $M_2O$ is selected from the group consisting of, individually or in combination, $Li_2O$ and/or $Na_2O$ and/or $K_2O$.

At this point some comments have to be made relating to the nature and composition of the glass material. The electrically insulating fixing material might according to the description be a glass. A glass is known to be an amorphous material in which crystallites are not desired. In contrast, a glass ceramics is a material in which crystallized zones are embedded within a glass matrix. The crystallized zones might amount to 99% or more of the overall material. Glass ceramics are often produced from a glass material which is then subjected to a heat treatment in which at least partial crystallization is induced. Because the crystallized zones of the glass ceramics usually have a different CTE (coefficient of thermal expansion) than the amorphous glass matrix, the concentration of the crystallized zones as well as their specific CTE can be used to adapt the overall CTE of the glass ceramics material. In the present disclosure, an amorphous glass material is as suitable as the glass ceramics material. Both have as electrically insulating fixing material being present in the access opening the composition described above.

The electrically insulating glass or glass ceramics material with the described composition provides a superior volume resistivity for this group of materials. Because the volume resistivity is a function of the temperature at which the value of the volume resistivity is measured, the volume resistivity at the temperature of 350° C. is specified above. The volume resistivity decreases with increasing temperatures. This limits the maximum operational temperature of the described feed-through elements, because the electrically insulating fixing material loses its insulating properties at a certain temperature. By providing such a high minimum value for the volume resistivity at the temperature of 350° C., the feed-through elements according to this disclosure are most advantageously suitable for applications at high temperatures which were barred before. Approximately the value of the volume resistivity at 250° C. is ten times the value at 350° C.

The electrical resistance to be measured between the functional element and the support body also depends, besides on the volume resistance of the electrically insulating fixing material and the temperature to which the feed-through element is exposed, on the geometry of the feed-through device, e.g. from the minimal distance between the functional element surface embedded in the insulating material and the inner wall of the access opening which is in contact with the insulating material. Because of the high value of the insulating material's volume resistivity it is possible to design a feed-through element with a comparably compact size. Such preferred embodiment is represented by a feed-through element, wherein the electrically insulating fixing material electrically insulates the functional element from the support body with an electrical insulation resistivity of at least 500 MΩ at the operational temperature of 260° C.

The functional element can fulfill various functions within a feed-through element according to the present description. The most common case is when the functional element is an electrical conductor. In this case the functional element might be a full or hollow pin or tube. Such pin might be made from metal or other suitable conductors. However, the functional element can in the contents of the present description also fulfill other functions, e.g. it can represent a waveguide for e.g. microwaves or sound waves to be guided through the feed-through. In these cases the functional element might mostly be a tube, preferably made from metal or ceramics. The functional element might also be used to guide a cooling fluid such as cooling-water or cooling-gases through the feed-through element. Another possible embodiment of the functional element is simply a holding element, which carries further functional elements, e.g. thermo elements or fibers as light guides. With other words, in this embodiment the functional element might serve as adapter for functional elements which could not be directly fixed in the electrically insulating glass or glass ceramics material. In these cases the functional element might most suitably be a hollow element or a tube.

It is not only the geometrical design such as the thickness of the electrically insulating glass or glass ceramics fixing material and the access opening which define the maximum pressure to which the feed-through element according to invention could be exposed, but also the bonding strength of the glass or glass ceramics material within the access opening. If such material is used to seal an access opening, there are chemical and physical bonding phenomena on the contact area of the glass or glass ceramics material and the inner wall of the access opening or the outer surface of the functional element. These bonding phenomena might be chemical reactions or physical interactions between the material of the inner wall of the access opening and therefore the material of the support body and/or the functional element on the one side, and the components of the glass or glass ceramics fixing material on the other side. If the composition of glass or glass ceramics fixing material is chosen in the best way, those bonding phenomena significantly contribute to the strength of the connection between the fixing material and the elements to be fixed. In the context of the present description, the benefit of the described composition can be demonstrated by the maximum pressure exceeding 42000 psi at the operation temperature of 260° C. which the feed-through element according to the description can withstand. This maximum pressure indicates an operational pressure to which the feed-through element can be exposed for a longer period of time. The maximum pressure is also dependent on the operational temperature, at room temperature maximum pressures exceeding 65000 psi can be constructed with the described feed-through element. The short time peak pressures can significantly exceed those maximum pressures.

If a described feed-through element suffers from pressure overload, typically the fixing material together with the functional element or the functional element alone bursts out of the access opening. Then surrounding matter can pass the access opening and might destroy equipment nearby. Therefore highest possible values for the maximum pressure are desired.

The described electrical insulating glass or glass ceramics fixing material is capable of hermetically sealing at least one access opening. The term hermetical sealing is known to specify the quality of the sealing, in this case the hermetic means that the sealing is essentially completely tight against leakage of all possible media. Normally, hermeticity is measured by helium leak testing. The procedure is known in the industry. Helium leaking rates below $1.0 \times 10^{-8}$ cc/sec (cubic centimeters per sec) at room temperature or $1.69 \times 10^{-10}$ mbar l/s at room temperature indicate that the sealing of the access opening is hermetic.

The described composition range of the electrically insulating fixing material provides the possibility to essentially match the CTE of the electrically insulating fixing material to the CTE of the support body. This means that the values of the CTEs of the electrically insulating fixing material and the support body are essentially the same or at least are similar. In this case, a so called matched seal is present. The forces which hold the electrically insulating fixing material within the access opening are predominantly the chemical and/or physical forces caused by the described interaction of the glass or glass ceramics components and the material of the support body at the interface of the glass or glass ceramics material at the inner access opening wall.

As alternative, the composition of the electrically insulating glass or glass ceramics fixing material can be within the described range and/or the material of the support body can be chosen so that a so called compression seal is the result. In this case the CTE of the support body's material is larger than the CTE of the electrically insulating glass or glass ceramics fixing material. When during the manufacturing of the feed-through device the support body together with glass or glass ceramics fixing material (and the functional element) being inserted into the at least one access opening is heated, the glass or glass ceramics fixing material melts and connects with the inner wall of the referring access opening. When this assembly is cooled, the support body virtually shrinks onto the glass or glass ceramics slug within the access opening and provides a physical pressure force onto the glass or glass ceramics slug which contributes to the forces holding the electrically insulating glass or glass ceramics fixing material within at least one access opening. Thereby the support body exerts an additional holding pressure towards the electrically insulating fixing material. This additional holding pressure is at least present at room temperature, and preferably contributes to the secure sealing of at least one access opening up to the temperature at which the feed-through element was manufactured. Of course, the above mentioned chemical or physical molecular forces mentioned in the context of the matched sealing might still be also present.

Essentially, the support body can be manufactured from all suitable materials and/or material combinations. However, advantageous materials for the support body are ceramics, preferably $Al_2O_3$ ceramics and/or stabilized $ZrO_2$ ceramics and/or Mica.

Alternatively, the support body advantageously can be manufactured from metals and/or alloys. Preferred materials from this group are stainless steel SAE 304 SS and/or stainless steel SAE 316 SS and/or Inconel.

The functional element is preferably essentially made from a metal material and/or alloy selected from the group consisting of Beryllium Copper and/or Nickel-Iron Alloy and/or Kovar and/or Inconel.

Ceramics and metal based materials are known to the one skilled in the art and are therefore not described in further detail. Both, support body and functional element, can of course also comprise other materials than the described ones, e.g. in other regions than nearby the access openings, and/or might contain a sandwich structure from different materials.

The performance of the described feed-through element can be tuned if certain material combinations are used for the support body and the functional element. Specifically preferred is the combination of a functional element made from Beryllium Copper combined with a support body made from stainless steel SAE 304 SS or stainless steel SAE 316 SS. As well preferred is the combination of a functional element made from Nickel-Iron Alloy combined with support body made from stainless steel SAE 304 SS or Inconel. Another preferred combination is represented by a functional element made from Kovar combined with support body essentially made from Inconel. Also specifically preferred is the combination of a functional element made from Inconel combined with support body made from Inconel. The preferred combinations are summarized in the following table.

| support body material | functional element material |
|---|---|
| SAE 304 SS | Beryllium Copper |
| SAE 316 SS | Beryllium Copper |
| SAE 304 SS | Nickel-Iron Alloy |
| Inconel | Nickel-Iron Alloy |
| Inconel | Kovar |
| Inconel | Inconel |

Within the described composition range of the electrically insulating glass or glass ceramics fixing material there are of course preferred ranges for the contents of its components. Those preferred ranges can provide preferred properties to the glass or glass ceramics fixing material, especially but not necessarily with the aforesaid materials for support body and/or functional element.

Preferably, the electrically insulating fixing material contains a glass or glass ceramics comprising in mole % on oxide basis 35%-50% $SiO_2$, 5%-15% $B_2O_3$, 0%-5% $Al_2O_3$, 30%-50% MO and 0% to less than 1% $M_2O$.

Most preferred is the embodiment, in which the electrically insulating fixing material contains a glass or glass ceramics comprises in mole % on oxide basis 35%-50% $SiO_2$, 5%-15% $B_2O_3$, 0%-<2% $Al_2O_3$, 30%-50% MO and 0% to less than 1% $M_2O$.

The meaning of the abbreviations MO and $M_2O$ is already described in detail and also has to be applied for the aforesaid preferred composition ranges.

Especially preferred is an embodiment in which the glass or glass ceramics within the described composition ranges is essentially free of $M_2O$ and/or PbO and/or fluorines. Essentially free means that there is no intentional content of the named components. However, unavoidable impurities might be present which might be caused by erosion of the glass melting equipment during its operation and/or artificial and/or natural contamination of the raw materials used in glass production process. Usually such impurities do not exceed the amount of 2 ppm (parts per million). If $M_2O$ is eliminated from the glass composition, the volume resistivity of the electrically insulating glass or glass ceramics fixing material can reach the highest values. However, the sealing of the access openings might be more difficult due to the more demanding glass melting properties. PbO and fluorines are undesired components because of their negative impact on the environment.

Additional components might be preferred to improve the glass melting and processing properties of the electrically insulating glass or glass ceramics fixing material. Such preferred additional components are $ZrO_2$ and/or $Y_2O_3$ and/or $La_2O_3$, which might be present either in the initial or preferred embodiments of the glass or glass ceramics composition, each from 0% up to 10% in mole % on oxide basis, either individually or in every possible combination.

It is also preferred that the electrically insulating glass or glass ceramics fixing material comprises up to 30% of the overall volume of fillers. Such fillers are usually inorganic fillers. Most advantageously $ZrO_2$ and/or $Al_2O_3$ and/or MgO are chosen, either individually or in every possible combination.

Besides choosing the composition of the electrically insulating glass or glass ceramics fixing material within the disclosed composition ranges, it is also possible to improve the pressure resistance of the feed-through element by mechanical measures which can be applied during the manufacturing of the support body. Therefore at least one access opening can be adapted to provide even more resistance against pressure loads. Such measures advantageously are represented by means for preventing a movement of the electrically insulating fixing material in relation to the support body, which are applied to the inner access opening wall. Such means for preventing a movement can be structures which interlock with the electrically insulating glass or glass ceramics fixing material within the access opening. All geometrical structures which provide such interlocking functionality are suitable, e.g. recesses and/or protruding areas of the inner access opening wall. A protruding area might be a shoulder within the access opening, which locally reduces the diameter of the access opening. Such shoulder is most often located near the surface of the support body which is opposite to the side where the pressure load is expected.

In most cases at least one access opening has at least a region with a cylindrical profile. Advantageous embodiments of access openings with such measures for preventing a movement of the electrically insulating fixing material in relation to the support body comprise an access opening, which has at least a region with a truncated profile. The truncated profile reduces the diameter of the access opening, the wider diameter is most often located near the surface of the support body which faces the expected pressure load and the narrowed diameter is most often located near the surface of the support body which is opposite to the expected pressure load.

Another measure to enhance the maximum pressure loads and to prevent the extrusion of the functional element out of the electrically insulating fixing material is to provide the circumferential wall of the at least one functional element with means for preventing a movement of the functional element in relation to the electrically insulating fixing material and the support body. Again, those means for preventing a movement can be local variations of the diameter of the functional element, e.g. shoulders, recesses, truncated areas etc. Those structures are located in the region of the functional element which is fixed within the electrically insulating fixing material, therefore those means for preventing a movement provide an interlock with the electrically insulating fixing material.

The feed-through element according to the present disclosure can be most advantageously used in downhole drilling and/or downhole exploration devices, especially for the exploration and/or exploitation of oil and/or natural gas resources. This application area of course comprises land based as well as underwater applications. Those applications can benefit especially from the pressure resistance and the electrical isolation capabilities the feed-through element provides.

Another advantageous application area of the feed-through element according to the present disclosure is the containment of an energy generation or an energy storage device such as power plants and/or gas pressure tanks and/or electrochemical cells and/or molten salt tanks etc. Here, especially the electrical isolation properties at high temperatures are relevant for a safe and reliable containment.

The feed-through element according to the present disclosure provides features, which also allow the application for the safe containment of all kind of matter, especially matter which is toxic and or at least harmful for the environment and/or health. For example, a feed-through element according to the present disclosure can be used to connect emergency equipment and/or sensors and/or actuators within the containment with operational devices and/or personnel outside the containment. Such containments are typically present in chemical and/or physical reactors or storage devices, e.g. used for at least intermediate storage of nuclear waste.

Also applications in space benefit from the temperature and pressure resistance of the feed-through element according to the present disclosure. Space missions, such as satellites in planetary orbits or interplanetary missions, as well space rover vehicles are subject to extreme environments, especially in view of high and low temperatures and temperature changes. The reliability of feed-through elements used in those devices is often relevant for the success of the mission.

The feed-through element according to the present disclosure is especially suitable to provide a feed-through of a housing which encapsulates a sensor and/or actuator.

BRIEF DESCRIPTION OF THE SEVERAL VIEWS OF THE DRAWINGS

FIG. 5b shows the top view of a feed-through element according to FIG. 6a.

FIG. 6b shows the profile of a feed-through element according to FIG. 6a.

DETAILED DESCRIPTION OF THE INVENTION

Figure 1A:
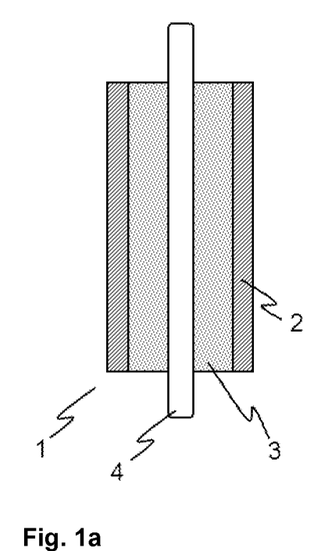
FIG. 1a shows the profile of the principle of a feed-through element according to the present disclosure.
Figure 1B:
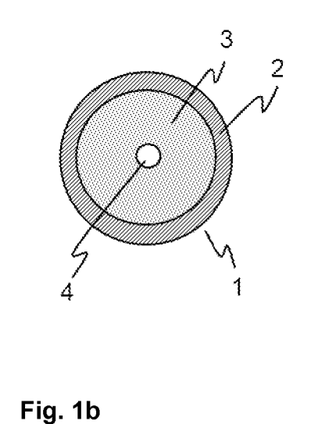
FIG. 1b shows the view from above towards a feed-through element.

FIG. 1a and FIG. 1b represent the principle of a feed-through element 1 according to the present disclosure. The support body 2 has in this example the outer contour of a cylinder. Of course all structures are possible, e.g. disc shaped elements, are also comprised from the invention. There is an access opening in the support body 2, which is sealed by the electrically insulating fixing material 3. The access opening defines a passageway through the support body 2 and naturally has an inner access opening wall, which interfaces with the electrically insulating fixing material 3. The functional element 4 is arranged within and is held by the electrically insulating fixing material 3 within the access opening. In this embodiment, the functional element 4 is a pin which serves as conductor for electric current. In this example, the support body 2, the access opening and the functional element 4 are arranged in a coaxial configuration. In this example, the access opening also has a cylindrical profile. The access opening might be a bore within the support body, which is an appropriate way to produce an access opening in a generally cylindrical support body 2 made from a full material. It is also possible to produce such a support body 2 from a cast material, where the access opening might already be created during the casting process.

Figure 2:
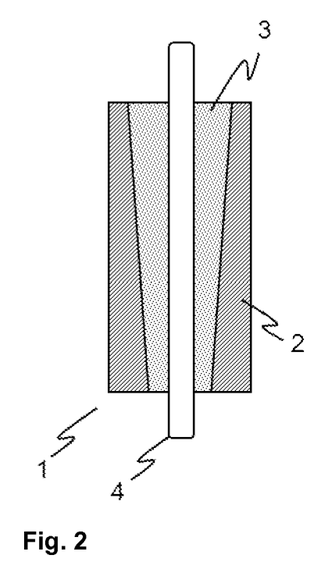
FIG. 2 shows the profile of the principle of a feed-through element according to the present disclosure with an access opening having a truncated profile which represents means for preventing a movement of the electrically insulating fixing material in relation to the support body.

The embodiment represented by FIG. 2 generally corresponds to the embodiment according to FIG. 1a and FIG. 1b, but the access opening has a truncated profile. This truncated profile narrows the diameter of the access opening at the bottom side of the feed-through element 1. In this principle drawing of the example, the truncated profile spans over the entire length of the access opening. Of course it is also possible that the truncated profile is only present in a first region of the access opening, whereas a second or further region might have different profiles, e.g. cylindrical profiles. By locally reducing the diameter of the access opening, the pressure which is required to expel the electrically insulating fixing material 3 out of the access opening is increased because the truncated profile interlocks with the fixing material 3 and virtually acts like a wedge when the pressure is applied on the top side of the feed-through element 1, where the diameter of the access opening is comparably wider. Thereby the maximum pressure the feed-through element 1 can withstand can be increased by the design of the access opening's profile. Such truncated profiles can again be produced e.g. by drilling and polishing of a full material, e.g. by using a taper reamer, or by casting using an appropriate forming tool.

Figure 3:
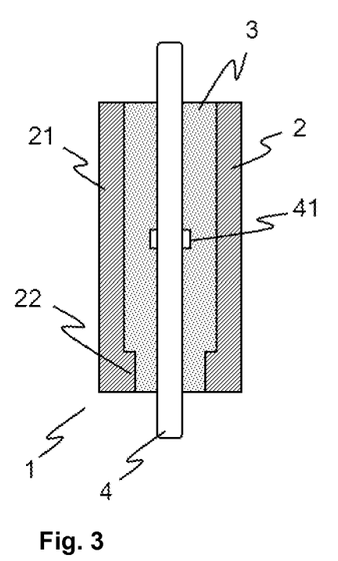
FIG. 3 shows the profile of the principle of a feed-through element according to the present disclosure with an access opening having a shoulder in its cylindrical profile which represents means for preventing a movement of the electrically insulating fixing material in relation to the support body. Furthermore, the functional element is provided with a shoulder which represents means for preventing a movement of the functional element in relation to the electrically insulating fixing material and the support body.

The advantageous general principle of locally narrowing the diameter of the access opening is also applied within the embodiment according to FIG. 3. Here the access opening has a first region 21 with a cylindrical profile and a second region 22 with a cylindrical profile, whereas the diameter of the cylindrical profile in the second region 22 is smaller than the diameter of the cylindrical profile in the first region 21. Thereby a shoulder in the access opening wall is created, which again serves as means for preventing a relative movement of the electrically insulating fixing material 3 in relation to the support body 2.

As also shown in FIG. 3, the functional element 4 has means for preventing a movement 41 of functional element 4 in relation to the electrically insulating fixing material 3 and in relation to the support body 2. In this example, these means are represented by the protruding area 41 of the functional element, which in this embodiment creates a shoulder on the functional element's surface. Although the top view of the embodiment according to FIG. 3 is not shown, it is easily foreseeable for the one skilled in the art that the functional element's protruding area 41 must not have a disc structure. It is also possible that the upper and lower surface of the protruding area 41 has edges, e.g. the in the form of a square, a cross, a star etc., whereby also an interlocking functionality against torsion of the functional element 4 can be provided.

When designing a feed-through element 1 with means for preventing a movement of the electrically insulating fixing material 3 and/or the functional element 4 in relation to the support body one of course should have in mind that due to the local reduction of the diameter of the access opening the overall electrical resistance of the feed-through element's electrically insulating fixing material 3 against electrical short cuts, especially between the functional element 4 and the support body 2 might be reduced. Therefore it could be beneficial to use recesses instead of protrusions as means for preventing a movement.

The glass or glass ceramics materials used as electrically insulating fixing material 3 described in the present disclosures provide an excellent volume resistivity. However, the overall insulating performance and the flash over voltage of the feed-through element 1 can be further improved by the introduction of further protective elements 31, 32, especially further insulators. Therefore the embodiment according to FIG. 4 also includes protective elements 31, 32 on or at least near the surface of the electrically insulating glass or glass ceramics fixing material 3. The protective elements 31, 32 can be essentially made of other glasses, e.g. solder glass, and/or organic compounds or polymers, e.g. silicone adhesives or high temperature epoxy systems. The feed-through element 1 without protective elements 31, 32 has a typical flash over voltage of 1.0 kV. For the feed-through element 1 with insulators 31, 32 flash-over voltages of 2.0 kV and more can be achieved.

Figure 4:
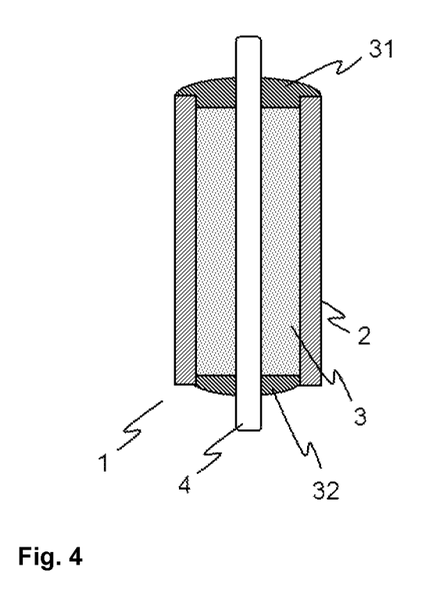
FIG. 4 shows the profile a feed-through element according FIG. 1a, wherein the surface of the electrically insulating fixing material is protected by a protection layer.

As can be also seen from FIG. 4, the protective elements 31, 32 prevent any contact of the glass or glass ceramics surfaces of the electrically insulating fixing material with other media. The glass or glass ceramics fixing materials according to the present disclosure are chemically stable against air and most gaseous media. However, in harsh environments, more aggressive media might come into contact with the surface of the electrically insulating glass or glass ceramics fixing material 3. The corrosion capabilities of these media often also increase with increasing temperatures. Therefore the embodiment according to FIG. 4 also includes protective elements 31, 32 on or at least near the surface of the electrically insulating glass or glass ceramics fixing material 3. These protective elements 31, 32 prevent any contact of the glass or glass ceramic surfaces with other media. As example, the protective elements 31, 32 might be made from the same materials as for the insulators described above. All other suitable materials could be used as well. Of course it is also possible that the protective elements 31, 32 are only present at one side of the electrically insulating glass or glass ceramics fixing material 3. The embodiment comprising at least one protective element 31, 32 are most beneficially used in the downhole exploration and/or exploitation applications.

As can be also seen from FIG. 4, in this example the surface of the electrically insulating glass or glass ceramics fixing material 3 is not in line with the top and/or bottom surface of the support body 2. This embodiment might be beneficial for the application of the protective elements 31, 32. However, it is also foreseen and comprised by the invention that these recessed surface levels could also be present in the embodiments without protective elements 31, 32 and that the embodiment with protective elements 31, 32 might also have surfaces of the electrically insulating glass or glass ceramics fixing material 3 being in line with the top and/or bottom surface of the support body 2.

Figure 5A:
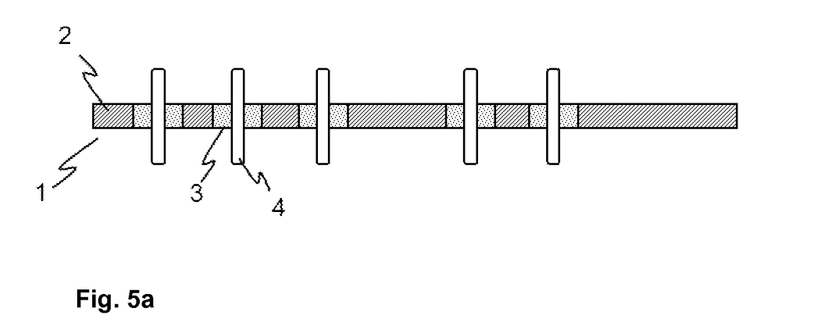
FIG. 5a shows the profile a feed-through element according to the present description, whereas the support body is provided with a plurality of access openings.
Figure 5B:
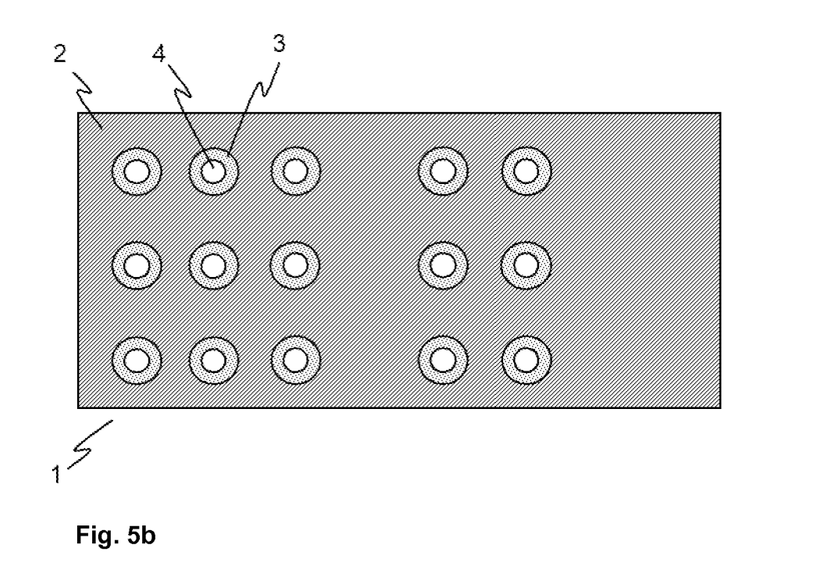

FIG. 5a shows the profile of a feed-through element 1 according to present disclosure with a plurality of access opening within a support body 2. This so called planar element has dimensions which are wider than high. As can be seen from FIG. 5b, which shows the top view of the feed-through element 1, the access openings can be arranged in a matrix. The matrix itself is variable, which means that the location of the access openings can be chosen according to the desired application. This embodiment can e.g. be used to provide multiple electrical and/or electronic components with electric current, e.g. to power them and/or to lead signals generated by these components through the support body 2. The support body might or might not seal the housing of a referring device. The support body 2 might be manufactured by a metal and/or alloy, or a ceramics material.

Figure 6A:
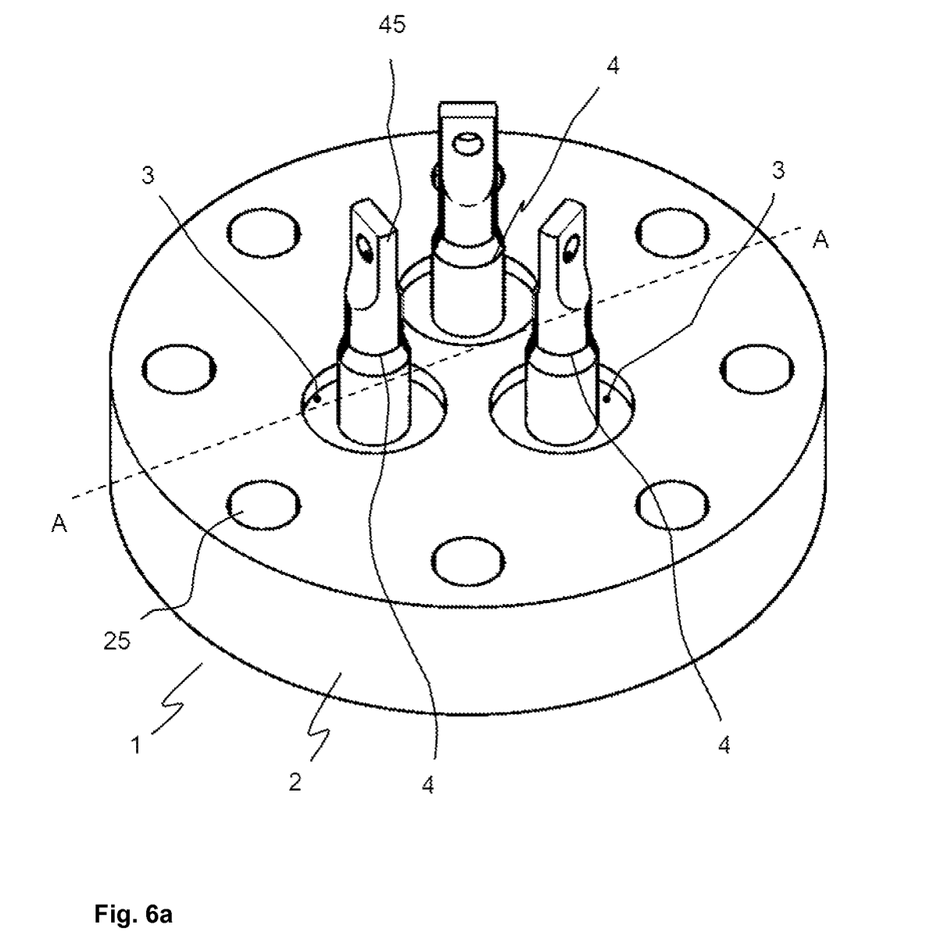
FIG. 6a shows the perspective view of a feed-through element according to the present description, which typically is used in containment of energy generation or energy storage devices.

In FIG. 6a, the perspective view of a so-called large feed-through element 1 is shown. Such feed-through elements 1 are typically used as feed-through of a containment of a power plant or the feed-through of a containment of a gas container. The support body is in this example a disc shaped element, preferably made from stainless steel. The support body has bores 25, which can be used to fix the feed-through element 1 at other components, e.g. housings and containments. The support body 2 therefore in this example represents a flange. In this embodiment there are three access openings sealed with electrically insulating fixing material 3, in which the functional elements 4 are fixed. The functional element 4 in this example is a conductor for electric current, which is specifically adapted to high power and high voltage. The functional element 4 also has a region 45 at its end, which can be used to provide connector capabilities, especially to connect power lines and/or plugs.

Figure 6B:
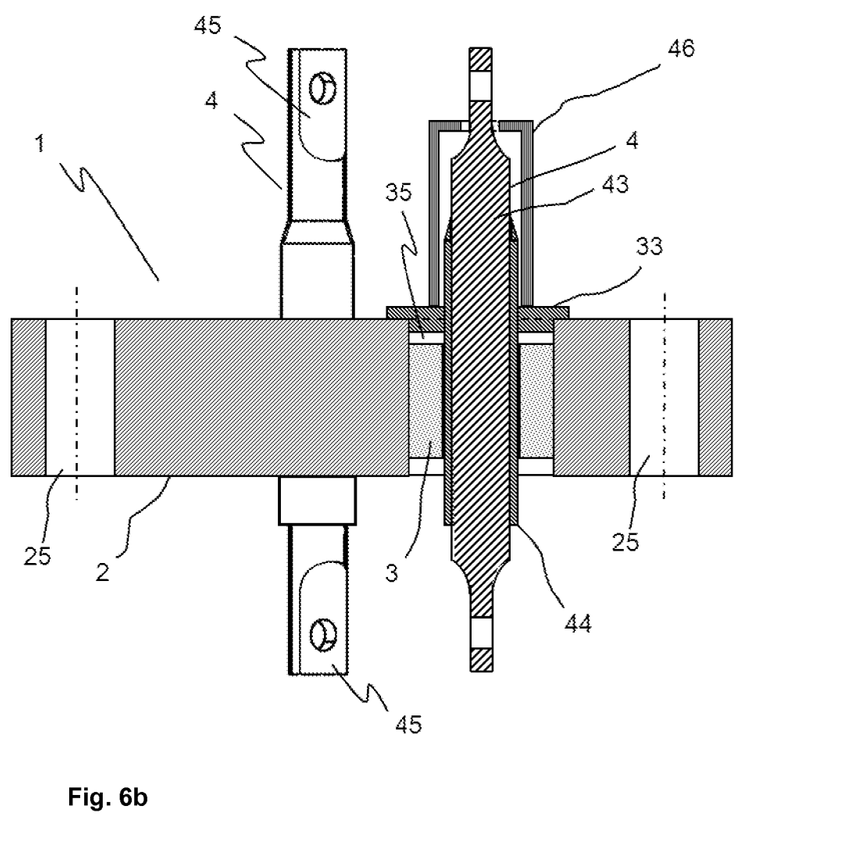

FIG. 6b shows the profile of the feed-through element 1 according to FIG. 6a along the cut line A. The bores 25 run through the support body 2. However, all other measures of fixing the feed-through element 1 to another element/or device are also possible. As can be also seen, the functional element 4 comprises two major elements. One is the tube 44, which is in contact with the electrically insulating fixing material 3 and which is held by the electrically insulating fixing material 3 within the access opening. The second element 43 of the functional element 4 is the conductor for electric current 43. The conductor 43 and the tube 44 are usually fixed together e.g. by a brazed or soldered connection. The tube 44 and the conductor 43 consist in this example of different materials, e.g. metals. This construction is beneficial if the conductor 43 due to its material composition cannot build a hermetic connection with the electrically insulating fixing material 3. Then the tube 44 consisting of a metal being capable to be hermetically sealed in the electrically insulating fixing material 3 is used. For example, for the conductor 43 copper might be used especially because of its good capabilities as conductor for electric current. But copper can hardly be fixed within a glass or glass ceramics based electrically insulating fixing material 3. Then a tube 44 consisting essentially e.g. of stainless steel might be sealed within the electrically insulating fixing material 3 and the conductor 43 is soldered with the tube 44.

In the example according to FIG. 6b, there also is the protective element 33 which covers the access opening on one side of the feed-through element 1. This protective element can be the same as the protective elements 31, 32 as described used in FIG. 4. Of course other kinds of protective elements 33 could also be used. In this example, the protective element 33 is used to mechanically protect the electrically insulating fixing material 3 within the access opening and to improve the flash-over voltage. The protective element 33 is in this example not in contact with the surface of the electrically insulating fixing material 3. Consequently there is a cavity 35 between the surface of the electrically insulating fixing material 3 and the bottom side of the protective element 33. This cavity might or might not be filled with specified media, e.g. protective fluids or gases. According to FIG. 4, the functional element 4 is furthermore protected by a cap 46 which could help to prevent mechanical damage to the functional element 4, especially the conductor 43 and tube 44 protruding above the level of the support body. Of course the cavity 35 and/or cap 46 could be absent in other embodiment of a feed-through element 1 according to the present disclosure.

Figure 7:
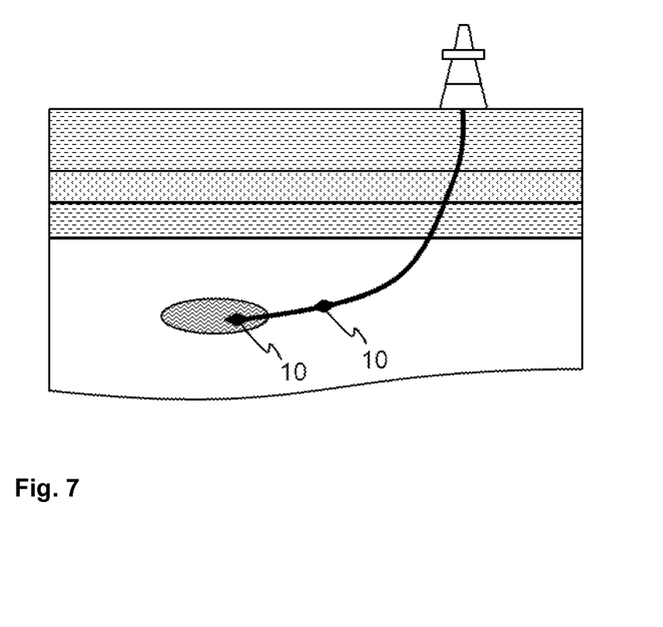
FIG. 7 shows a downhole drilling installation with a feed-through element according to the present description.

FIG. 7 shows the principle of the beneficial use of the disclosed feed-through element in downhole exploration and/or exploitation installation. In this example a drilling device is used to reach the reservoir of e.g. oil or natural gas. It is known and state of the art that the drilling device can be steered in various directions. Without such steering capabilities it would be impossible to reach the relevant reservoirs. In order to facilitate such steering capabilities, a drilling device comprises components which have to be contacted via feed-through elements 10 according to the present disclosure.

Figure 8:
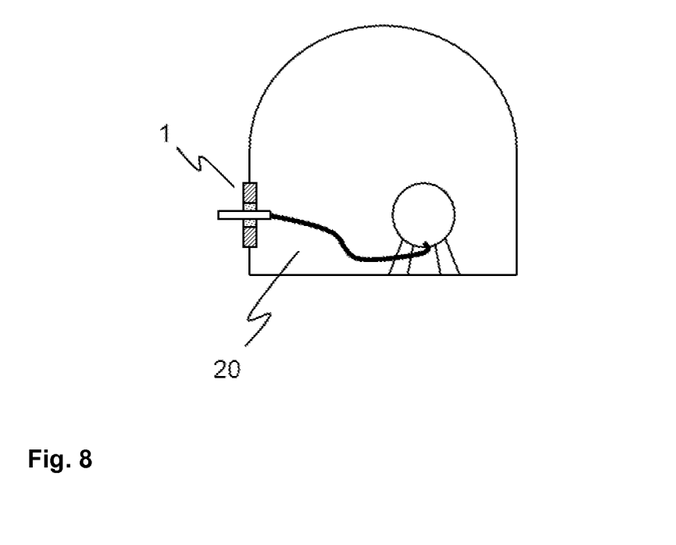
FIG. 8 shows a containment of an energy generation device with a feed-through element according to the present description.

In FIG. 8 the containment 20 of an energy generating device is shown. The generator has to be safely encapsulated within the containment, also in emergency and failure state situations. A feed-through element 1 according to the present disclosure is advantageously used in order to provide contact with the generator and/or devices within the containment. Such devices are e.g. devices to monitor the operation conditions of the generator and/or to steer the generator or other devices.

EXAMPLES

As can be seen from the explanations above, the feed-through element according to the present invention provides its improved performance due to the composition of the electrically insulating glass or glass ceramics material. A large number of examples for glass or glass ceramics materials have been melted and applied to a described feed-through element. The compositions of six preferred glass materials and the value of their respective volume resistivity are summarized in Table 1.

TABLE 1

Fixing material compositions and volume resistivity

| | Composition [mole %] | | | | | |
|---|---|---|---|---|---|---|
| | Ex. 1 | Ex. 2 | Ex. 3 | Ex. 4 | Ex. 5 | Ex. 6 |
| $SiO_2$ | 42.5 | 42.5 | 38.7 | 44.5 | 45.0 | 47.0 |
| $B_2O_3$ | 13.0 | 13.0 | 8.9 | 8.9 | 12.0 | 6.4 |
| $Al_2O_3$ | 1.5 | 1.5 | 1.6 | 1.6 | 0.0 | 1.6 |
| BaO | 33.0 | 33.0 | 0.0 | 34.6 | 33.0 | 17.3 |
| CaO | 0.0 | 0.0 | 36.7 | 0.0 | 0.0 | 16.5 |
| MgO | 7.0 | 10.0 | 6.7 | 7.3 | 7.0 | 8.1 |
| $Y_2O_3$ | 3.0 | 0.0 | 3.4 | 3.1 | 3.0 | 3.1 |
| $ZrO_2$ | 0.0 | 0.0 | 4.0 | 0.0 | 0.0 | 0.0 |
| Volume resistivity at 350° C. [Ωcm] | $1.5 \times 10^{11}$ | $1.4 \times 10^{11}$ | $3.9 \times 10^{11}$ | $6.0 \times 10^{10}$ | $1.8 \times 10^{11}$ | $3.8 \times 10^{10}$ |

All fixing material compositions are listed in mole % on oxide basis. All fixing materials Ex. 1 to Ex. 6 were amorphous glass materials. The advantages of the examples Ex. 1 to Ex. 6 according to the invention are obvious when they are compared with the properties of known glass materials, when these are used for feed-through element according to the present disclosure. Such comparative examples are summarized in Table 2 and named as CE 1 to CE 3.

TABLE 2

Comparative fixing material compositions and volume resistivity

| Composition [mole %] | CE 1 | CE 2 | CE 3 |
|---|---|---|---|
| $SiO_2$ | 63.4 | 58.0 | 67.1 |
| $B_2O_3$ | — | 1.8 | 1.5 |
| $Al_2O_3$ | 0.3 | 1.1 | 3.1 |
| PbO | 29.4 | — | — |
| BaO | 0.1 | 2.0 | — |
| $Fe_2O_3$ | — | 0.8 | — |
| $Li_2O$ | — | 21.8 | 22.8 |
| $Na_2O$ | 0.2 | 3.0 | 0.4 |
| $K_2O$ | 6.5 | 6.9 | 2.3 |
| F | — | 4.6 | — |
| $Sb_2O_3$ | 0.2 | 0.01 | — |
| $P_2O_5$ | — | — | — |
| ZnO | — | — | — |

TABLE 2-continued

Comparative fixing material compositions and volume resistivity

| Composition [mole %] | CE 1 | CE 2 | CE 3 |
|---|---|---|---|
| CaO | — | — | — |
| Volume resistivity at 350° C. [Ωcm] | $4.0 \times 10^9$ | $3.2 \times 10^7$ | $6.0 \times 10^5$ |

As can be seen from the comparative examples, the best volume resistivity of those materials is by an order of magnitude lower than the lowest volume resistivity of the fixing materials according to the invention.

Figure 9:
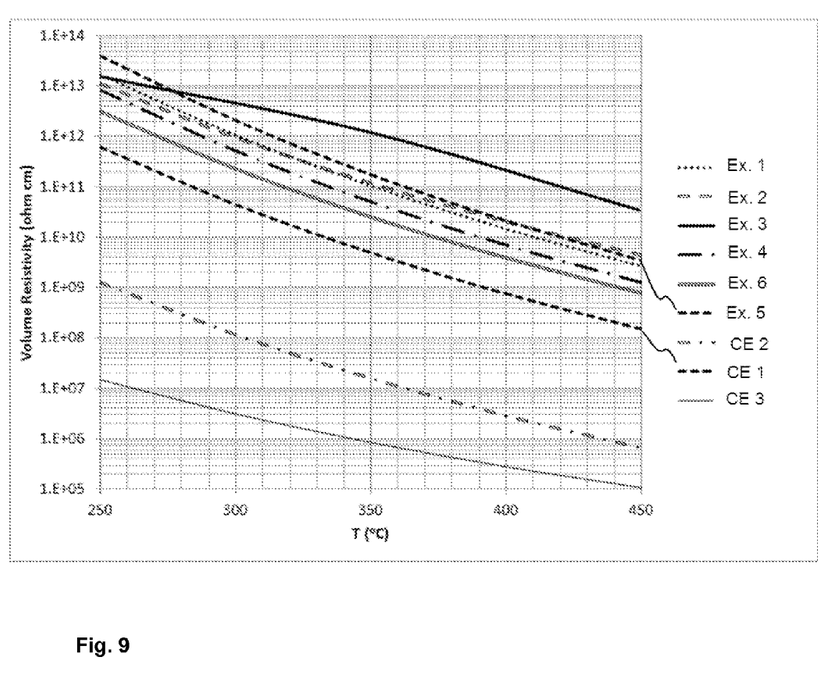
FIG. 9 shows the temperature dependence of the volume resistivity of glass or glass ceramics fixing materials according to the invention and comparative examples.

The temperature dependence of the volume resistivity of the example fixing materials Ex. 1 to Ex. 6 on a logarithmic scale is shown in the graph according to FIG. 9. Also shown is the corresponding graph for the comparative examples named in the graph. As can be seen from the graph according to FIG. 9, the best comparative example is CE 1. However, as it has to be stressed that a logarithmic scale is used, even CE 1 cannot even come close to the volume resistivity behavior of the electrically insulating fixing material according to the invention. With fixing materials with a volume resistivity below $1.0 \times 10^{10}$ Ωcm at the operational temperature of 350° C. it was not possible to manufacture a feed-through element with an overall electrical resistivity of at least 500 MΩ at the operational temperature of 260° C. Those properties are only provided by the fixing material disclosed herein.

The glass systems according to the Ex. 1 to Ex. 6 showed excellent mechanical stability when used in a feed-through element. Operational maximum pressure values of more than 42000 psi (at 260° C.) and values of more than 65000 psi (at room temperature) were achieved. It even became obvious that higher maximum pressures are possible, but the mentioned values represent the upper limit of the available measurement equipment. Therefore the electrically insulating fixing materials according to the present disclosure provide by their volume resistivity and their pressure resistance two significant advantages to feed-through elements which are thereby enabled for the application in harsh environments.

What is claimed is:

1. A feed-through element for harsh environments, comprising:
a support body with an access opening;
at least one functional element is arranged in the access opening; and
an electrically insulating fixing material securing the at least one functional element in the access opening and electrically insulating the at least one functional element from the support body,
wherein the electrically insulating fixing material contains a glass or a glass ceramics with a volume resistivity of greater than $1.0 \times 10^{10}$ Ωcm at the temperature of 350° C. and said glass or glass ceramics comprises in mole % on oxide basis:

| | |
|---|---|
| $SiO_2$ | 25-55, |
| $B_2O_3$ | 0.1-15, |
| $Al_2O_3$ | 0-15, |
| MO | 20-50, and |
| $M_2O$ | 0-<2, | wherein MO is selected from the group consisting of MgO, CaO, SrO, BaO, and any combinations thereof, and
wherein $M_2O$ is selected from the group consisting of $Li_2O$, $Na_2O$, $K_2O$, and any combinations thereof.

2. The feed-through element according to claim 1, wherein the electrically insulating fixing material has an electrical insulation resistivity of at least 500 MΩ at an operation temperature of 260° C.

3. The feed-through element according to claim 1, wherein the at least one functional element is selected from the group consisting of an electrical conductor, a waveguide, a cooling-fluid line, a housing of a thermo element, and a hollow element which carries further functional elements.

4. The feed-through element according to claim 1, wherein the electrically insulating fixing material fixes the at least one functional element within the access opening to withstand pressures in excess of 42000 psi at an operational temperature of 260° C.

5. The feed-through element according to claim 1, wherein the electrically insulating fixing material hermetically seals the access opening.

6. The feed-through element according to claim 1, wherein the electrically insulating fixing material has a CTE that matches a CTE of the support body.

7. The feed-through element according to claim 1, wherein the electrically insulating fixing material has a CTE that is smaller than a CTE of the support body, whereby at least at room temperature the support body exerts an additional holding pressure to the electrically insulating fixing material.

8. The feed-through element according to claim 1, wherein the support body is made from a ceramic selected from the group consisting of $Al_2O_3$ ceramics, stabilized $ZrO_2$ ceramics, Mica, and any combinations thereof.

9. The feed-through element according to claim 1, wherein the support body is made from a metal selected from the group consisting of stainless steel SAE 304 SS, stainless steel SAE 316 SS, Inconel, and alloys or combinations thereof.

10. The feed-through element according to claim 1, wherein the functional element comprises a metal material selected from the group consisting of Beryllium Copper, Nickel-Iron Alloy, Kovar, Inconel and alloys or combinations thereof.

11. The feed-through element according to claim 1, wherein the functional element consists essentially of Beryllium Copper and the support body consists essentially of stainless steel SAE 304 SS or stainless steel SAE 316 SS.

12. The feed-through element according to claim 1, wherein the functional element consists essentially of Nickel-Iron Alloy and the support body consists essentially of 304 SS or Inconel.

13. The feed-through element according to claim 1, further comprising a connector element consisting essentially of Kovar, wherein the support body consists essentially of Inconel.

14. The feed-through element according to claim 1, further comprising a connector element consisting essentially of Inconel, wherein the support body consists essentially of Inconel.

15. The feed-through element according to claim 1, wherein the glass or glass ceramic comprises in mole % on oxide basis:

| | |
|---|---|
| $SiO_2$ | 35-50, |
| $B_2O_3$ | 5-15, |
| $Al_2O_3$ | 0-5, |
| MO | 30-50, and |
| $M_2O$ | 0-<1. |

16. The feed-through element according to claim 1, wherein the glass or glass ceramic comprises in mole % on oxide basis:

| | |
|---|---|
| $SiO_2$ | 35-50, |
| $B_2O_3$ | 5-15, |
| $Al_2O_3$ | 0-<2, |
| MO | 30-50, and |
| $M_2O$ | 0-<1. |

17. The feed-through element according to claim 1, wherein the glass or glass ceramic is essentially free of materials selected from the group consisting of $M_2O$, PbO, fluorines, and any combinations thereof.

18. The feed-through element according to claim 1, wherein the glass or glass ceramic additionally comprises in mole % on oxide basis:

| | |
|---|---|
| $ZrO_2$ | 0-10, |
| $Y_2O_3$ | 0-10, and |
| $La_2O_3$ | 0-10. |

19. The feed-through element according to claim 1, wherein the glass or glass ceramic comprises up to 30% of volume of fillers.

20. The feed-through element according to claim 19, wherein the fillers are selected from the group consisting of $ZrO_2$, $Al_2O_3$, MgO, and any combinations thereof.

21. The feed-through element according to claim 1, wherein the access opening has an inner access opening wall with a structure that prevent movement of the electrically insulating fixing material in relation to the support body.

22. The feed-through element according to claim 1, wherein the access opening has at least a region with a cylindrical or truncated profile.

23. The feed-through element according to claim 1, further comprising a connector element having a structure that prevents movement of the connector element in relation to the electrically insulating fixing material and the support body when pressure is exerted on the feed-through element.

24. A downhole oil and/or gas drilling or exploration device comprising the feed-through element according to claim 1.

25. A containment of an energy generation or energy storage device comprising the feed-through element according to claim 1.

26. A containment of a reactor or storage device of toxic and/or harmful matter comprising the feed-through element according to claim 1.

27. A spacecraft or space rover vehicle comprising the feed-through element according to claim 1.

28. A sensor or actuator being encapsulated within a housing comprising the feed-through element according to claim 1.

* * * * *